United States Patent [19]

Wirz

[11] Patent Number: 4,475,319
[45] Date of Patent: Oct. 9, 1984

[54] PROCESS FOR MACHINING A WORM-TYPE WORKPIECE WITH A WORM-TYPE TOOL

[76] Inventor: Walter Wirz, Feldstrasse 27b, 8330 Pfäffikon, Switzerland

[21] Appl. No.: 321,148

[22] Filed: Nov. 13, 1981

[30] Foreign Application Priority Data

Nov. 14, 1980 [CH] Switzerland .......................... 8476/80

[51] Int. Cl.³ ............................ B24B 1/00; B24B 3/12
[52] U.S. Cl. ..................................... 51/287; 51/50 PC; 51/52 R; 51/95 GH; 409/12; 409/66
[58] Field of Search ............. 51/50 PC, 52 R, 52 HB, 51/95 R, 95 GH, 95 LH, 95 TG, 105, 66, 287, 288; 125/11 T, 11 CC, 11 TP, 11 N; 409/12, 20, 24, 48, 66, 75, 76; 10/152, 153

[56] References Cited

U.S. PATENT DOCUMENTS

| | | | |
|---|---|---|---|
| 2,663,292 | 12/1953 | Mottu | 51/95 TG X |
| 2,830,571 | 4/1958 | Mahlmeister | 125/11 CC |
| 2,981,038 | 4/1961 | Flanders | 51/288 |
| 3,023,546 | 3/1962 | Beck | 51/288 X |
| 3,561,171 | 2/1971 | Van Vleet et al. | 51/288 |
| 3,568,373 | 3/1971 | Stade et al. | 51/288 X |
| 3,905,156 | 9/1975 | Vogelsanger | 51/50 PC X |
| 4,218,850 | 8/1980 | Sakai | 51/50 PC X |

FOREIGN PATENT DOCUMENTS 748587 4/1944 Fed. Rep. of Germany .

*Primary Examiner*—Robert P. Olszewski
*Attorney, Agent, or Firm*—Sughrue, Mion, Zinn, Macpeak & Seas

[57] ABSTRACT

A process for dressing a single or multiple-grooved worm or threaded workpiece by a single or multiple-grooved worm or threaded dressing tool includes the turning of the workpiece and tool with the dressing tool in a comb-type contact with the workpiece. By using an additional axial relative movement between the dressing tool and the workpiece, determined by the radial positioning and return movements, the contact points are displaced such that the desired grinding profile is produced on the workpiece. Since the entire surface area of the instantaneous contact points is significantly smaller than the entire profile area of the workpiece, the cutting forces which occur are relatively small, so that high dressing speeds can be obtained. It is also possible to make various flank corrections on the workpiece. The apparatus for carrying out the process is also disclosed.

10 Claims, 10 Drawing Figures

PROCESS FOR MACHINING A WORM-TYPE WORKPIECE WITH A WORM-TYPE TOOL

BACKGROUND OF THE INVENTION

The present invention is directed to a process for machining a single or multiple groove worm or threaded-type workpiece with a single or multiple groove worm or threaded-type tool and the apparatus for carrying out this process.

German Pat. No. 748.587 discloses a process for contouring by worm-formed grinding tools. A worm-formed gear hob is used as the dressing tool which is brought into operation with the threads of the workpiece. Choice of appropriate contour enables the axle of the dressing tool to be brought parallel to the axle of the workpiece so that for carrying out a dressing operation, the dressing tool which is disposed in combing relation with the workpiece only needs to be moved in a radial direction. The dressing tool has cutting surfaces made of hard metal or other material of extreme hardness. Since the dressing tool stays engaged along with the workpiece throughout the entire contour, the cutting forces during the dressing and, accordingly, the resultant heat are both very high. This leads to finishing difficulties. As a consequence of heat expansion, it is also difficult to stay within tolerances. Further, no flank-forming corrections can be made on the workpiece with this dressing tool.

SUMMARY OF THE INVENTION

The present invention provides a new and improved process and apparatus which solves the above-identified problems in an efficient and effective manner.

The present invention provides a new and improved process for machining a worm-type or threaded-type work piece by means of a worm-type or threaded-type dressing tool whereby during the rotation of the two worms in parallel meshing relation, the dressing tool is moved radially relative to the workpiece. By means of additional axial movement between the dressing tool and the workpiece it is possible to obtain a desired axial profile or contour for the threads of the workpiece. The additional axial movement of the dressing tool relative to the workpiece can be generated by an additional rotational movement of the tool with respect to the workpiece which is superimposed on the basic rotational movement of the dressing tool or by physically displacing the dressing tool in an axial direction. The profile head comprised of a grinding coating on the dressing tool thread may have a cylindrical surface with curved flanks for carrying out specialized profiling or may have a circular cross-section for achieving a variety of various contour forms on the threaded-type workpiece.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 6a is a side elevation view of the gearing in FIG. 6.

DETAILED DESCRIPTION OF THE INVENTION

Figure 1:
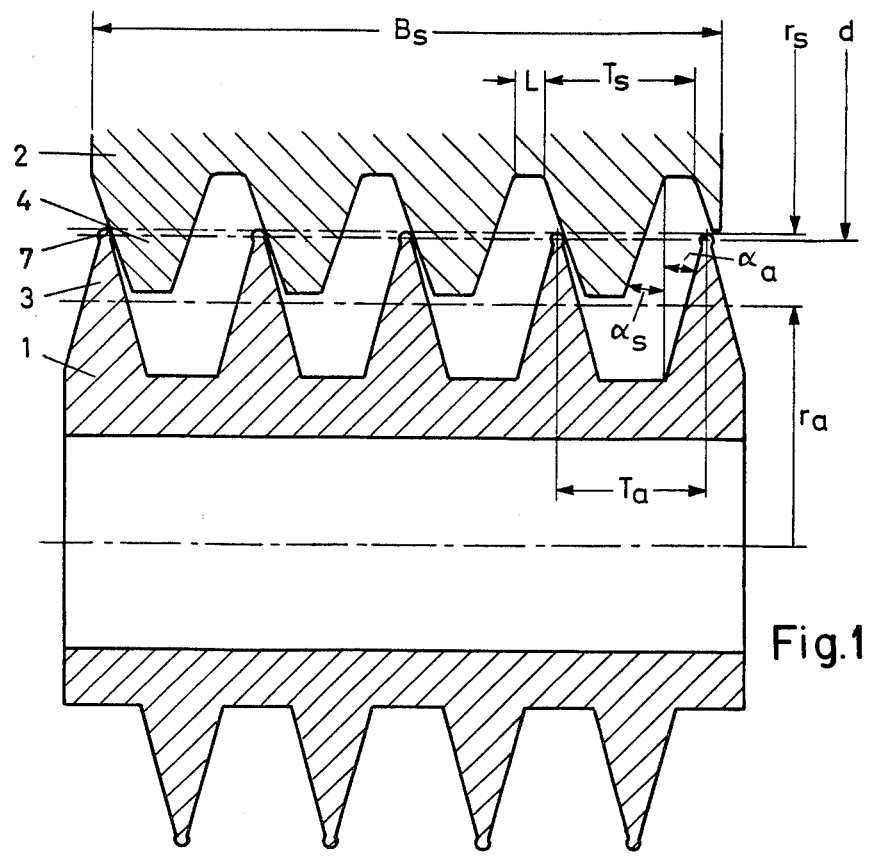
FIG. 1 is an axial cross-section view of a worm-type dressing tool which is engaged with a worm-type workpiece.

As shown in FIG. 1, a threaded-type dressing tool, hereinafter called a dressing tool 1, is engaged with a threaded-type workpiece, hereinafter called a workpiece 2. Both the dressing tool 1 and workpiece 2 have a single groove and the pitch $T_a$ of the dressing tool 1 is identical to the pitch $T_s$ of the workpiece 2. The tool 1 and workpiece 2 have the same modulus m, and the following relation holds:

$$T_a = T_s = m \cdot \pi.$$

The thread of each element 1 and 2 is multiple-cut, whereby the profiles 3 of the dressing tool 1 engage the profiles 4 or the workpiece 2 in a comb-like or interleaved manner.

Figure 2:
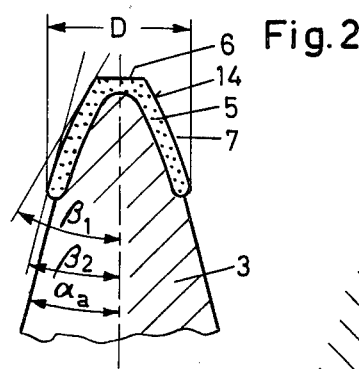
FIG. 2 is a detailed sectional view showing one form of the axial profile of the dressing tool.

The edges of the dressing tool 1 having a grinding coating 5 of diamond, cubic boric nitride, or another material of extreme hardness (FIG. 2). The coating 5 extends over the entire edge surface 6 as well as laterally down toward the profile foot of the dressing tool for a short distance. This sideways distance can be very short.

The thickness D of the profile head 7 of the dressing tool 1 is smaller than the gap width L in the profile area of the workpiece 2 and the profile angle $\alpha_a$ of the dressing tool 1, measured in the axial cutting profile, is generally smaller than the profile angle $\alpha_s$ of the workpiece 2. The two angles could also be equal: $\alpha_a \leq \alpha_s$. In this design variation the profile angle $\alpha_a$ is about 15° such that the flank angle ($2\alpha_a$) is about 30°.

As can be seen from FIG. 1, the dressing tool 1 is in multiple engagement with the workpiece 2, whereby, when viewed in axial section, the profile heads 7 of the dressing tool 1 touch the contours 4 of the workpiece 2 along each of the small working areas 8. These instantaneous, small contact surfaces 8 lie at each point in time at an equal machining cross-measurement d of the workpiece 2 and upon the same section of the profile 4. Compared with the entire contour of the workpiece 2, the given contact and working areas 8 are very small.

This has the advantage that neither high cutting forces nor heat loads occur during the process, so that the contouring or dressing can be carried out with high precision and at high speed.

It is no longer necessary to slow down the workpiece 2 for dressing, since it is possible now to do the dressing at full grinding speed. This amounts to a major improvement, for reasons of time and energy conservation.

The dressing procedure, through which the entire contour of the workpiece 2 is dressed, consists of two simultaneous processes which are superimposed on one another:

(a) The dressing tool 1 and workpiece 2 are driven with the same basic turning speeds $W_s$ and $W_a$. Since the radius $r_a$ of the dressing tool 1 is smaller than the radius $r_s$ of the workpiece w, the peripheral speeds of the two elements are different, which results in a slippage. This difference in peripheral speeds is designated as dressing speed.

The dressing tool and workpiece are in constant contact, similar to the rotors of a worm-type pump or a worm-type compressor. A line of the entire profile surface is contoured upon the workpiece. This line lies on a radius of constant size, meaning that all similarly situated flanks of the workpiece are contoured simultaneously; i.e., after a full rotation of the workpiece all similarly situated flanks, using the axial section as a reference point, are contoured in the same place, independently of the width of the workpiece as long as the width of the dressing tool 1 is at least equal to that of the workpiece 2.

(b) The workpiece stands still and the dressing tool rotates: If the rotating dressing tool remains in constant contact with the motionless workpiece, they additionally have to be displaced in a radial direction corresponding to the desired axial section profile form. In this way the workpiece is contoured on a second line which roughly corresponds with the profile of an axial section, and which lies at approximately right angles to the first line described above. If the dressing tool has completed a revolution the axial section profile form has been generated along the entire width of the workpiece, whereby all teeth (when viewed from an axial section profile) are simultaneously contoured.

The second line does not correspond exactly with the axial section profile, since when viewed precisely it does not lie in a plane; this is because the contact points of the profile head of the dressing tool with the workpiece lie in a plane that is determined by the two axes of the workpiece and the dressing tool only in the case of contouring by cylindrical parts, due to the slope angle of the workpiece and the dressing tool. Defects arising in such cases, however, can be easily eliminated by the introduction of appropriate contouring corrections.

Through the overlapping of both processes (a) and (b) the entire surface of the workpiece 2 is machined. As a consequence of the additional rotation $\Delta\phi$ of the dressing tool 1 with respect to the workpiece 2, an additional axial displacement of the contact points 8 between the two elements occurs. The extent of the additional rotation, or the axial relative movement, is determined by the contour pattern desired for the workpiece profile and the size of radial feed and return motions.

Figure 4:
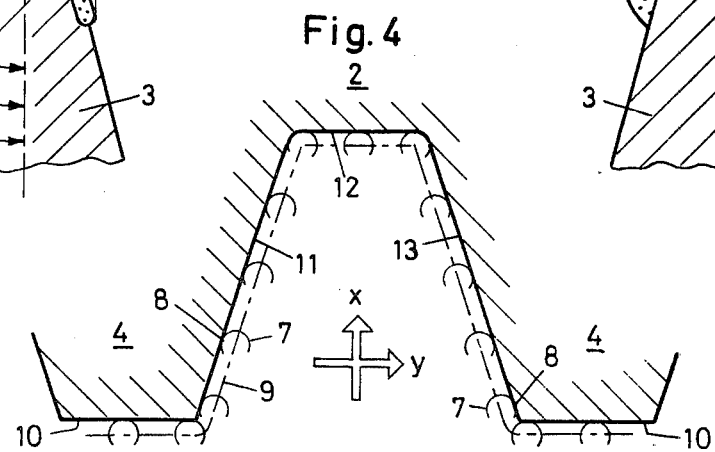
FIG. 4 is a schematic axial view of the path of a contouring head of the dressing tool during contouring of the workpiece profile.

FIG. 4 is an axial schematic view showing the instantaneous contact points 8 between the profile head 7 of the dressing tool 1 and the profiles 4 of the workpiece 2 during dressing. The relative path of the profile head 7 is designated 9. The profile head 7 moves along the cylindrical head area 10 of the profile 4, then along the profile flank 11 and the cylindrical profile surface 12, then along profile flank 13 and once again to the head area 10 of the neighboring profile.

The profile of the grinding coating 5 on the profile head 7 is chosen such that the machining rills are relatively flat. As in FIG. 2, the profile head surface 6 of the dressing tool 1 is cylinder-formed so that the surface area 12 and the profile head surface 10 of the workpiece 2 can be machined.

The flanks 14 of the grinding coating 5 are curved and form an angle with a maximum of $\beta_1$ to a minimum of $\beta_2$. These angles in the present example are 14° and 31° respectively.

The profile head 7 of the dressing tool 1 illustrated in FIG. 2 is meant for machining various workpieces 2 with a profile angle $\beta_s$ 15° to 30°. To take into account possible profile corrections, the minimum and maximum values of the angle $\beta$ are altered by an additional amount, e.g. 1°, with respect to the minimum and maximum values of the profile angle on the workpiece 2. The following thus holds true:

$$\beta_1 = 30° + 1° = 31°$$

$$\beta_2 = 15° - 1° = 14°.$$

If the dressing tool 1 is intended for the contouring of only a particular workpiece it suffices to alter the two tangent angles $\beta_1$ and $\beta_2$ merely by the amount necessary to carry out profile corrections. For a profile angle $\alpha_s$ on the workpiece of e.g. 20°, the two tangent angles $\beta_1$ and $\beta_2$ can be e.g. 21° and 19°. The machining rill is then very flat and there are no angular junctions between neighboring rills.

Figure 3:
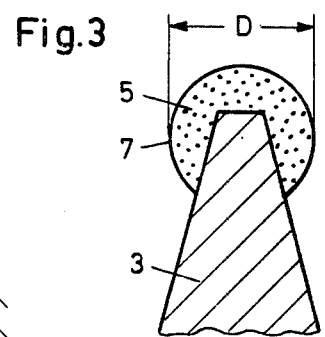
FIG. 3 is a detailed sectional view showing another form of the axial profile of the dressing tool.

In a further design variation of the profile head 7 of the dressing tool 1, the grinding coating 5 could take the form of a portion of a circle when seen in cross-section (FIG. 3). With such a profile head a variety of various contour forms can be machined, in which instance the individual rills to be machined must be placed next to one another closely enough and with a correspondingly small advance speed along the relative path 9, that the desired surface structure (microprofile) is formed on the workpiece.

The grinding coating could also extend over the entire side flanks of the dressing profile, in a manner not illustrated.

Although in general the dressing tool used for dressing has the same slope or pitch as the workpiece, it is also possible to form the axial division of the dressing tool as an integral multiple of the workpiece axial division. The dressing tool then no longer makes contact with each axial section profile of the workpiece, but instead with every 2nd, 3rd, or nth.

If the dressing tool and workpiece have the same direction of slope, dressing is performed by rotating the two in opposite directions; if there are different directions of slope, rotation is in the same direction.

Although in the above-mentioned process example the dressing and contouring of a workpiece by means of a dressing tool is specifically discussed, the process according to the invention could also be utilized for the manufacture of virtually any type of worm or threaded-type workpieces. The dressing tool could, for example, be some type of worm or threaded-type tool, e.g., a forming tool, and the workpiece could be replaced by another workpiece as well.

Figure 5:
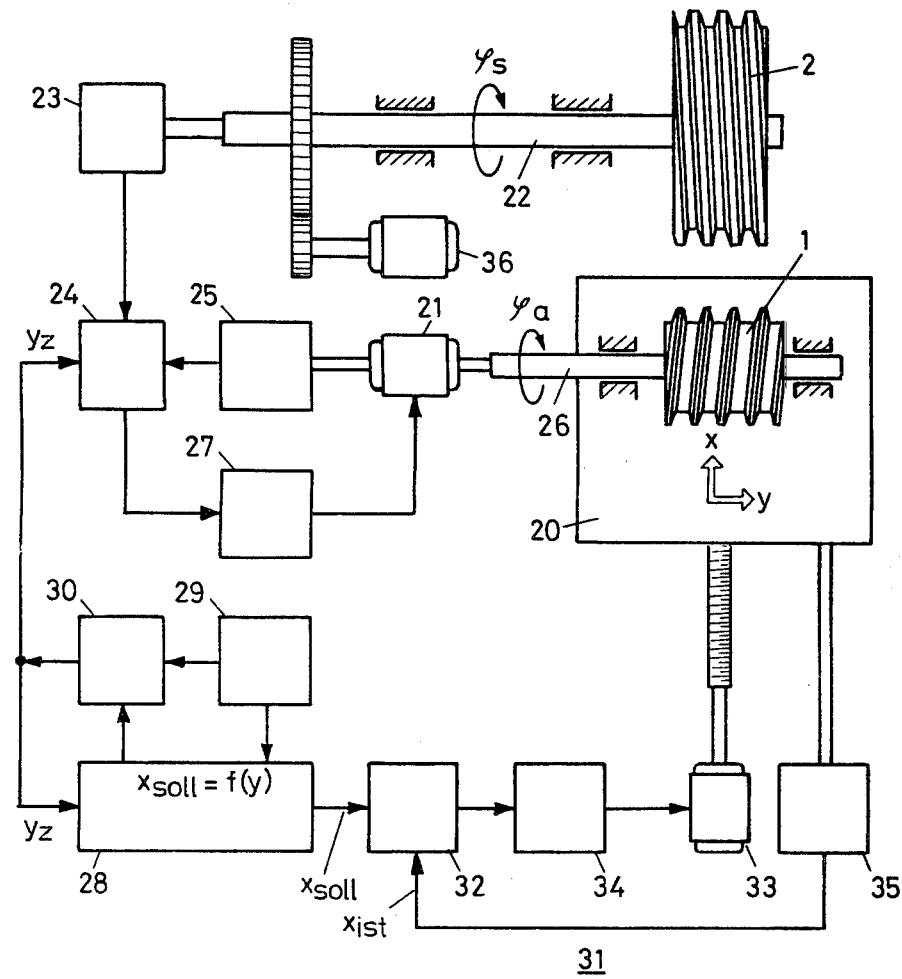
FIG. 5 is a block diagram of a device for the dressing and contouring of a workpiece by means of a dressing tool whereby the additional relative axial motion is generated by an additional turning motion of the dressing tool.

A device for carrying out the above-described dressing and contouring process is diagrammed in FIG. 5. The dressing tool 1 is mounted on a radially (in X-direction) adjustable slide 20 and driven via the dressing motor 21. The workpiece spindle 22 is driven via the grinding motor 36, whereby the given rotation angle position $\phi_s$ is measured via an angle stepping device 23 connected to the spindle 22. The turning angle impulses are fed into the electronic synchronization regulator 24, which is also fed with the rotation angle impulses of the angle stepping device 25 of the dressing tool spindle 26. There is also a power amplifier 27 in the regulator circuit for maintenance of the basic rpm relationship between the spindles 22 and 26 which affects the drive motor 21 for the spindle 26.

An electronic disc contour calculator 28, into which the various parameters such as the relationship between axial divisions, profile angles, profile forms, profile corrections, etc., are fed via the input unit 29, continuously calculates the positioning values in the functioning of the axial position of the contact points 8, whereby the feeder unit 30 generates the impulses for the relative rotation between the workpiece 2 and the dressing tool 1 with the programmed frequence in accordance with the given profile, advance data and the actual positioning value.

The device also has a situation regulator circuit 31 with a regulator 32, a power amplifier 34, and a dressing tool slide positioner 33 to enable continuous variation of the position of the dressing tool 1 in an X-direction.

The actual dressing tool slide position $x_{ist}$ is determined by means of the measurement element 35 and fed back to the regulator 32. The workpiece profile calculator 28 determines the desired positioning value $x_{soll}$ on the basis of additional impulses $y_z$, which are given out by the input unit 30 for generation of an additional rotational movement for the dressing tool 1.

This additional rotational movement, which is superimposed on the rotational movement of the dressing tool (which in turn is the result of the basic rotational relationship between the dressing tool and the workpiece), yields an additional axial movement of the contact points 8 between the two elements. By this means the contact points between the two elements are continuously displaced such that the desired threaded profile is generated on the workpiece. This can consist of straight-lined and curved-formed sections whereby any profile corrections can easily be taken care of.

By means of the two input units 30 and 29 it is possible to set the advance speed during dressing through the choice of an appropriate radial positioning movement. In this way the requirements of the given profile section to be contoured can be optimally met, in that each profile section is alloted the optimal positioning speed.

For contouring two-grooved workpieces with a single-grooved dressing tool, the basic rotational relationship between dressing tool and workpieces must be 2:1 whereby, however, the prescribed relative speed between the profile head of the dressing tool 1 and the workpiece profile would no longer exist. A more efficient method of avoiding this problem is to work with a dressing tool with a double division. The workpiece profile calculator must simply be programmed with the appropriate input such that the incoming guidance impulses $y_z$ are multiplied by two at the entrance to the calculator. All other inputs, e.g. workpiece profile data, are to be chosen as would be the case for a single-grooved workpiece. Workpieces with more than two grooves can also be machined by this method.

Figure 6:
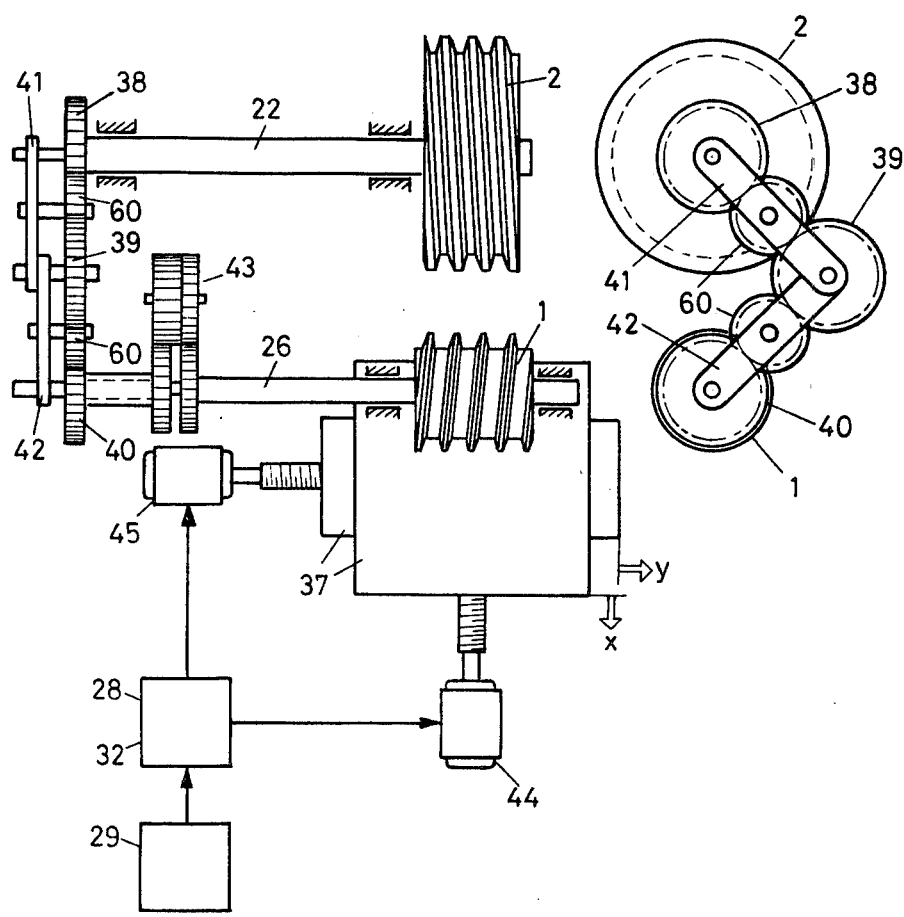
FIG. 6 is a block diagram of a further dressing arrangement whereby the additional axial motion is generated directly by axial displacement of the dressing tool and whereby the twin movement between the dressing tool and the workpiece is achieved mechanically.

A further device for carrying out the process is seen in FIG. 6, in which the same parts are designated with the same numerals as in FIG. 5. The additional axial displacement of the contact points 8 of the dressing tool and workpieces, calculated for the radial positioning and returning movements and containing the profile corrections, is no longer generated by means of an additional rotational motion here, but rather takes place as a direct result of the axial displacement of the dressing tool 1, which is now positioned on a cross slide unit 37.

The spindle 22 and spindle 26 are driven by a common motor (not illustrated). The spindle 26 is formed telescopically so that the dressing tool can be axially displaced.

Both spindles 22 and 25 are connected with each other via gear wheels 38 through 40, and these gear wheels contact one another via the two knee levers 41 and 42. By means of a switching transmission 43 the rotational direction of the dressing spindle 26 can be reversed so that the dressing can be done in synchronous or opposite rotational mode.

The basic rotational relationship given by the two gears 38 and 40 corresponds to the relationship of the number of grooves in the two threaded elements 1 and 2.

The workpiece profile and correction data are fed in via the input unit 29 and routed to the workpiece profile calculator 28. This then calculates the control signals for the two advance motors 44 and 45 for the cross slide drive in x and y direction.

Figure 7:
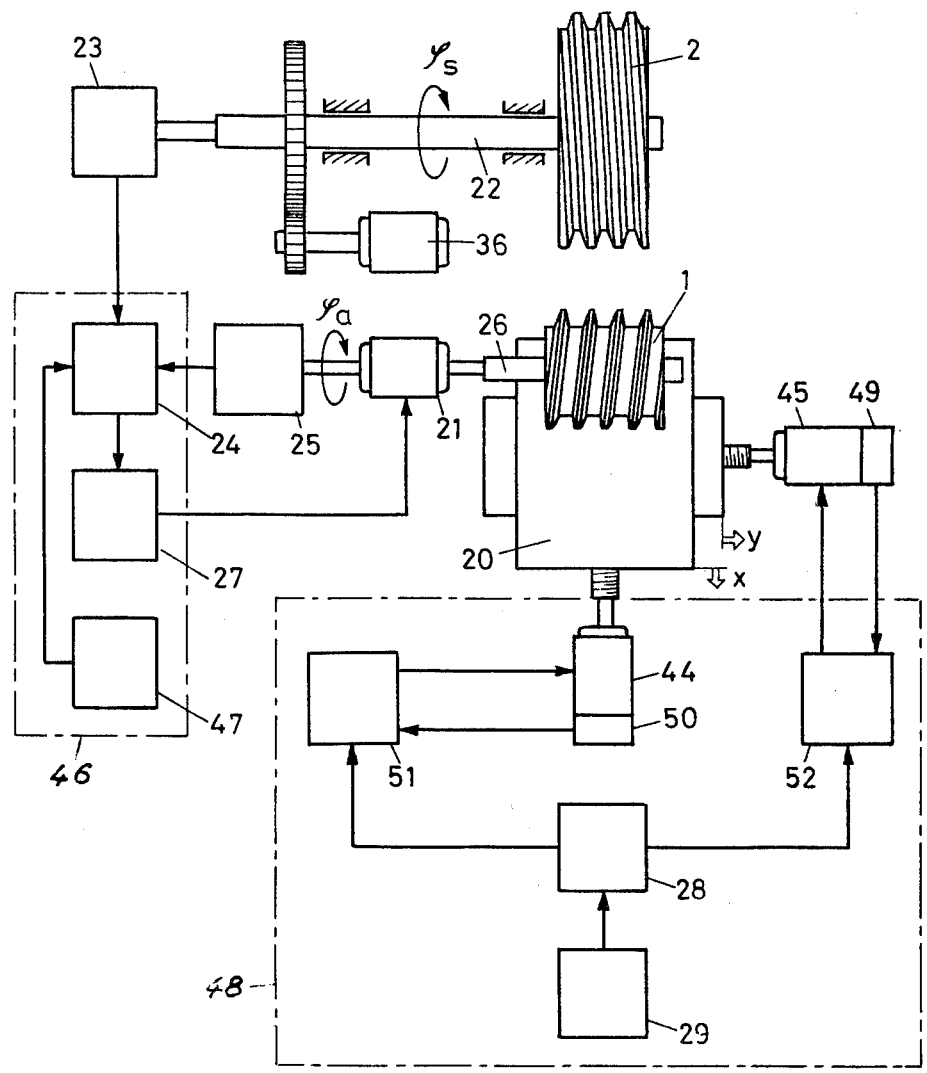
FIG. 7 is a block diagram of a dressing arrangement with electronically regulated twin movement between the dressing tool and the workpiece.

The synchronous motion of the dressing tool and workpiece 1 and 2 could also be electronically regulated as is shown in FIG. 7. In this case a first control component 46 with a synchronous rotation regulator 24 and a servo amplifier 27 functions with the dressing motor 21. The regulator 24 is fed with the control signals of the angle stepping devices 23 and 25. The slopes of the two threaded elements 1 and 2 are given via the input unit 47.

In the second control component 48 the movements of the cross slide 20 are influenced via the two advance motors 44 and 45, whereby the motors are also equipped with angle stepping devices 49 and 50. The second control component 48 consists of the input unit 29 for the workpiece profile data and for the profile contour advance, the workpiece profile calculator 28 and the two servo amplifiers 51 and 52 for the advance motors 44 and 45.

Figures 8, 8A:
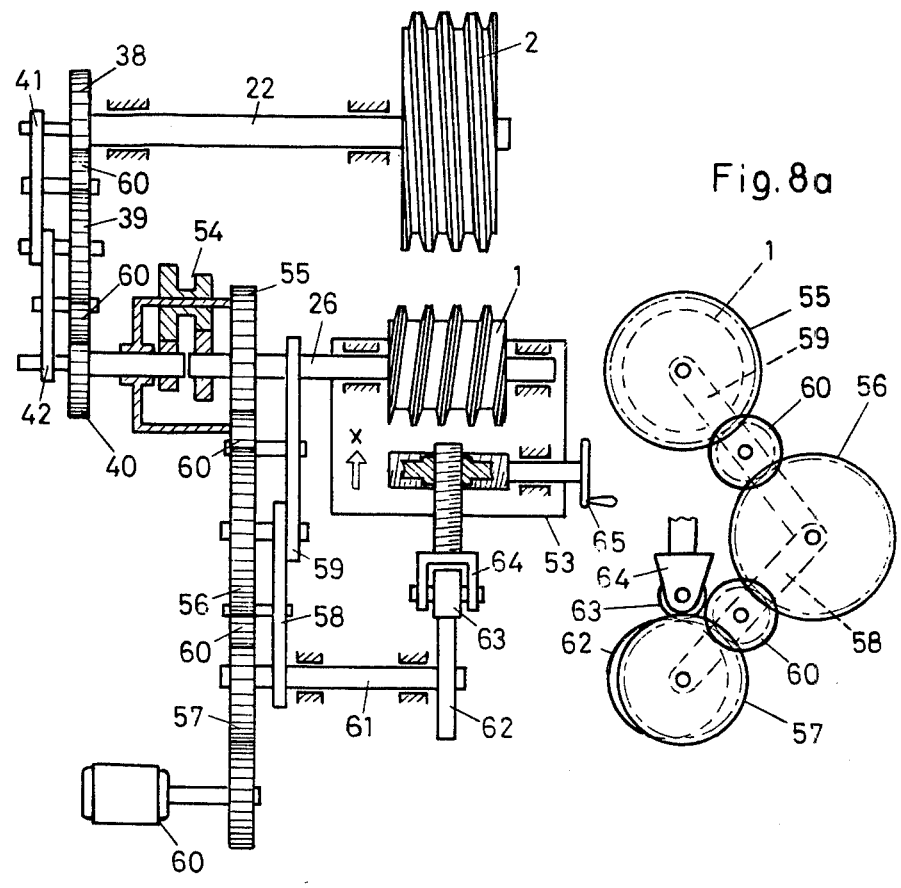
FIG. 8 is a schematic view of a purely mechanical dressing arrangement controlled by a curved disc.
FIG. 8a is a side elevation view of the gearing in FIG. 8.

Finally, FIG. 8 shows a device through which the coordination between the radial positioning movement and the necessary additional movement for generating the desired workpiece profile is achieved by means of a mechanical copying device with an easily interchangeable template.

The dressing tool 1 positioned on a slide 53 which is displaceable in an x-direction is connected with the workpiece 2 via the gears 38–42 and gear wheels 60 on levers 41 and 42. The threaded elements 1 and 2 are driven by a common drive motor which is not illustrated.

A differential gear set 54 is mounted on the dressing spindle 26; its outer gear 55, together with the gears 56 and 57, the two intermediate wheels 60, and the levers 58 and 59, form a further wheel joint. A drive motor 60' drives the gear 57 which sits on the curved disc shaft 61.

The end of the shaft opposite from the gear 57 carries the easily interchangeable curved disc 62.

The curved disc 62 is sensed by a curve following roller 63, which is positioned in a mount 64 on the dressing slide 53. By means of an adjustment spindle affecting the mount, the basic position for the advance slide 53 can be set.

The curved disc contains the information for the profile depth and the profile corrections. It generates the copy movements for the dressing slide in the x-direction. By means of rpm regulation of the motor 60', the contouring speed can be set. Thereby the processing time and also the surface roughness of the workpiece profile are also defined.

While the invention has been particularly shown and described with reference to preferred embodiments thereof, it will be understood by those in the art that various changes in form and details may be made therein without departing from the spirit and scope of the invention.

What is claimed is:

1. A process for machining a threaded-type workpiece with a threaded-type tool wherein said workpiece has a thread profile with a cylindrical head area, profile flanks and a cylindrical profile surface between opposed flanks having a given width and said tool has a thread profile with a profile head having a width less than the width of the cylindrical profile surface between opposed flanks on said workpiece each of said workpiece and tool having a given axial length, comprising rotating said workpiece and tool while radially moving said tool toward and away from said workpiece whereby the relationship of the rotating speeds corresponds with a basic turning speed relationship resulting from a relationship of the pitches of the workpiece and tool, moving said tool into contact with said workpiece with a combing action whereby the number of contact points is a function of the pitch of the workpiece and the length of the workpiece and tool, said contact points at any given time being located upon the same radius and the same sections of an axial section gear profile of said workpiece, and additionally moving said tool axially relative to said workpiece, which movement is based on the radial movements of the tool as well as various profile corrections, so as to displace said contact points such that the desired threaded profile is produced upon the workpiece.

2. A process as set forth in claim 1, wherein said additional axial relative movement is generated by an additional rotational movement of the tool with respect to the workpiece, whereby this additional rotational movement is superimposed upon the rotational movement of the tool which results from the basic rotational speed relationship between the workpiece and the tool.

3. A process as set forth in claim 1, wherein said additional axial relative movement is generated by a displacement of the tool in axial direction.

4. A process as set forth in claim 1, wherein each profile section of the workpiece corresponds to a specific amount of radial positioning and returning movement of said tool.

5. A process as set forth in claim 1, wherein harmonizing of the additional movement with the radial positioning and returning movements is done by means of a copying device with an interchangeable template.

6. A process as set forth in claim 1, wherein harmonizing of the additional movement with the radial positioning and returning movements is done by means of an electronic control device.

7. A process as set forth in claim 5, wherein the control templates are corrected, for generation of desired profile corrections.

8. A process as set forth in claim 6, wherein corresponding data is supplied to said electronic control device, for generation of desired profile corrections.

9. A process as set forth in claim 1, wherein the tool and workpiece are rotated in opposite directions when they have the same pitch and in the same direction when they have a different pitch.

10. A process as set forth in claim 1, wherein for trapezoid-shaped profiles of the profile head of the tool, the tool is moved in a path along the cylindrical head area of the workpiece profile then along the profile flank and the cylindrical profile surface, and then along the opposite profile flank and again to the head area of a neighboring workpiece profile.

* * * * *